United States Patent [19]
Sato

[11] Patent Number: 5,179,370
[45] Date of Patent: Jan. 12, 1993

[54] INFORMATION PROCESSING SYSTEM CAPABLE OF EDITING IMAGES

[75] Inventor: Minoru Sato, Kanagawa, Japan

[73] Assignee: Kabushiki Kaisha Toshiba, Kanagawa, Japan

[21] Appl. No.: 481,549

[22] Filed: Feb. 20, 1990

[30] Foreign Application Priority Data

Jul. 27, 1989 [JP] Japan ................................. 1-45736

[51] Int. Cl.⁵ .............................................. G09G 1/06
[52] U.S. Cl. ................................... 340/723; 340/747; 340/799
[58] Field of Search ............... 340/724, 726, 723, 721, 340/747, 799, 798, 723; 395/164, 165, 147; 382/41

[56] References Cited

U.S. PATENT DOCUMENTS

| | | |
|---|---|---|
| 3,849,592 | 11/1974 | Rosenheck. |
| 4,194,221 | 3/1992 | Stoffel. |
| 4,641,197 | 2/1987 | Miyagi. |
| 4,760,463 | 7/1988 | Nonoyama et al. |
| 4,992,781 | 2/1991 | Iwasaki et al. ...................... 340/747 |
| 5,041,992 | 8/1991 | Cunningham et al. ............. 340/747 |

FOREIGN PATENT DOCUMENTS

0262801A2 4/1988 European Pat. Off..

OTHER PUBLICATIONS

"IBM Technical Disclosure Bulletin" vol. 28, No. 6 Nov. 1985 pp. 2721-2724.

Primary Examiner—Ulysses Weldon
Assistant Examiner—Doon Yue Chow
Attorney, Agent, or Firm—Finnegan, Henderson, Farabow, Garrett and Dunner

[57] ABSTRACT

An information processing system capable of editing images is provided. The system can easily cut out desired image information even when the system must designate an arbitrary shape region which is used to cut out and edit image information.

6 Claims, 3 Drawing Sheets

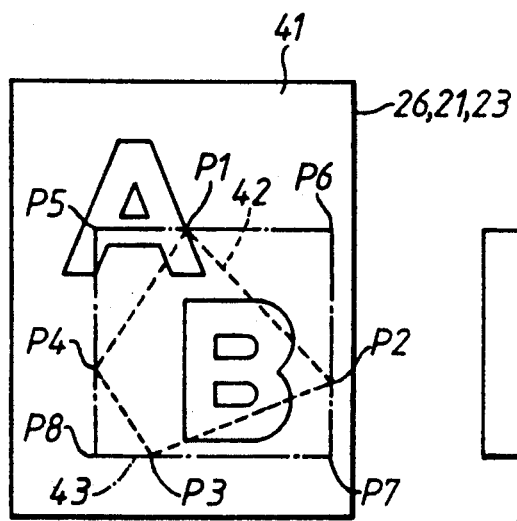
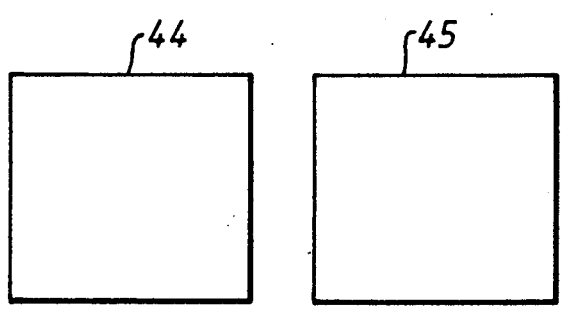
Fig.3(a).  Fig.3(b).  Fig.3(c).
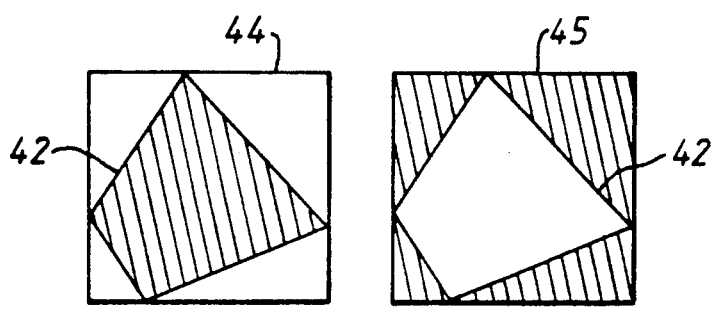
Fig.3(d).  Fig.3(e).
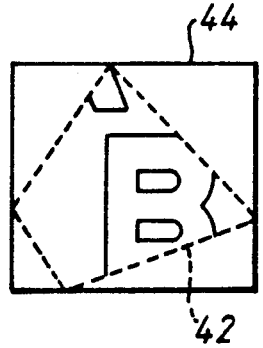
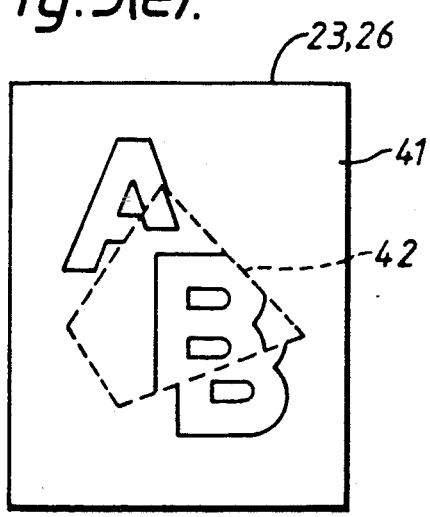
Fig.3(f).  Fig.3(g).

INFORMATION PROCESSING SYSTEM CAPABLE OF EDITING IMAGES

BACKGROUND OF THE INVENTION

1. Field of the Invention:

This invention relates to an information processing system, and more particularly to an information processing system that can retrieve image information from an image information storage apparatus, and edit the retrieved image information as the need arises.

2. Description of the Prior Art:

In a conventional information processing system, image information is stored in an image information storage apparatus (e.g., an optical disc apparatus). The system can retrieve image information from an optical disc, and display the same on the display apparatus. Further, the system can cut out a desired portion form the displayed image information, and synthesize the cutout image information and another image information. When the system cuts out a desired image information from the displayed image information, the system first designates the desired image by use of a rectangular region in general. The system then cuts out the image information within the designated rectangle.

Specifically, when the system cuts out the image information within a rectangle, the system can designate a desired rectangle only by calculating the coordinates of two opposite corners of the rectangle. Further, the system can scan and read the image information within the thus designated rectangle by use of an extremely simple configuration. Thus, the conventional system cuts out images by designating a rectangular region in most cases. However, in recent years, it has been required that the system must designate an arbitrary shape region which is used to cut out image information. To designate an arbitrary shape region, the system must process a large amount of coordinate information. Thus, the procedures of extracting image information become complicated and cumbersome.

Specifically, assume that the system cuts out the image information within an arbitrary shape region other than a rectangle. It becomes difficult for the system to determine a starting point and an ending point each time the system scans the image. In particular, when a desired region partially includes curves, the system must plot all the coordinates on the contour of the desired region. This becomes more difficult for the system to determine a starting point and an ending point each time the system scans the image. Further, it becomes extremely difficult for the system to perform the enlargement, reduction and rotation of the cutout image.

SUMMARY OF THE INVENTION

Accordingly, one object of the present invention is to provide an information processing system that can easily cut out desired image information even when the system must designate an arbitrary shape region which is used to cut out and edit image information.

Briefly, in accordance with one aspect of the present invention, there is provided an information processing system which comprises a first memory for storing image information, a designating section for designating a desired region of the image information stored in the first memory as a cutout region, a determining section for determining a rectangular region circumscribing the designated cutout region, a section for determining first and second work regions having the same size as the rectangular region, a memory for storing the first and second work regions, a section for designating a portion corresponding to the designated cutout region in the first work region as first data, and designating a region other than the portion as second data, a section for determining a new region displaying the cutout region by calculating information in the second work region and image information stored in the first memory, a section for copying image information in the designated cutout region into the first work region by calculating information in the first work region and the image information stored in the first memory, and a section for displaying the image information in the first work region in the new region.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2 and 3a-3g are diagrams illustrating the operation of the embodiment according to the present invention.

DESCRIPTION OF THE PREFERRED EMBODIMENTS

Figure 1:
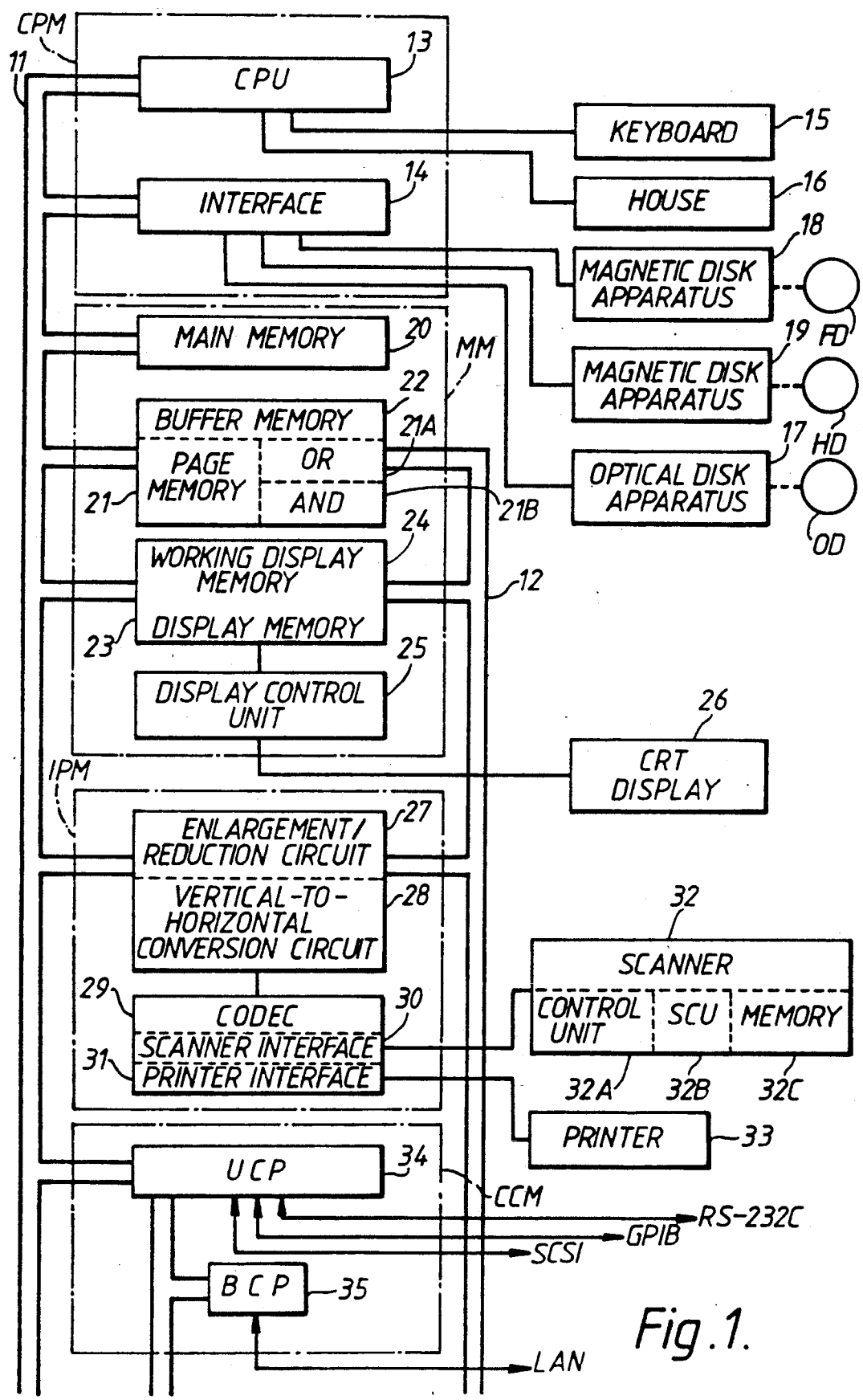
FIG. 1 is a block diagram illustrating a configuration of one embodiment according to the present invention.

Referring now to the drawings, wherein like reference numerals designate identical or corresponding parts throughout the several views, and more particularly to FIG. 1 thereof, one embodiment of this invention will be described.

In FIG. 1, a central processing module CPM and a communication control module CCM are connected to a system bus 11. A memory module MM and an image processing module IPM are connected to an image bus 12. The control module CPM comprises a CPU 13 and an interface 14, both connected to the system bus 11. The CPU 13 controls the entire system including a multi-task operation. A keyboard 15 and a mouse 16 are connected to the CPU 13. The keyboard 15 inputs various information including command information to the CPU. The mouse 16 serves as a pointing device, i.e., moves a cursor displayed on a CRT display 26 (to be later described). The mouse 16 has a first button and a second button (not shown) which designate the position of the cursor.

An optical disc apparatus 17 having an optical disc OD, a magnetic disk apparatus 18 having a flopy disk FD and a magnetic disk apparatus 19 having a hard disk HD are connected to the interface 14. The optical disc OD has image information stored thereon. The flopy disk apparatus 18 and the hard disk apparatus 19 have stored retrieval information for retrieving a desired image information from the optical disc OD. The apparatus 18 and 19 have also stored display information (process information) necessary for such retrievel. The memory module MM comprises a main memory 20 and a page memory 21.

The main memory 20 is connected to the system bus 11, and the page memory 21 is connected between the system bus 11 and the image bus 12. The memory module MM further comprises a buffer memory 22, a display memory 23, a working display memory 24 and a display control unit 25. The memories 22, 23 and 24 are connected between the system bus 11 and the image bus 12. The display control unit 25 is connected to the display memory 23. The main memory 20 has operation programs stored therein which serve for the CPU 13. The page memory 21 stores information which has been read by a scanner (to be later described) and information produced from an enlargement/reduction circuit 27. An OR logic circuit 21A and an AND logic circuit 21B are provided in the vicinity of the page memory 21. The OR logic circuit 21A produces a logical sum of one piece of image information and other piece of image information. The AND logic circuit 21B produces a logical product of one piece of image information and other piece of image information.

The buffer memory 22 is provided in a portion of the page memory 21, and stores information which has been read from the optical disc apparatus 17. The display memory 23 and the working display memory 24 both store display information. A CRT display 26 is connected to the display control unit 25. The unit 25 receives varied information stored in the display memory 23, and then causes the CRT display 26 to display the same. The image processing module IPM comprises the enlargement/reduction circuit 27, a vertical-to-horizontal conversion circuit 28, coding/decoding circuit (CODEC) 29, a scanner interface 30 and a printer interface 31. The circuits 27 and 28 are connected both to the system bus 11 and to the image bus 12.

The scanner interface 30 and the printer interface 31 are connected to the circuit 29 which is connected to the circuit 28. A scanner (two-dimensional scanning apparatus) 32 is connected to the scanner interface 30, and a printer 33 is connected to the interface 31. The circuit 27 enlarges/reduces image information supplied from the page memory 21. The circuit 28 converts the vertical-to-horizontal relationship of image information supplied from the page memory 21. The circuit 29 receives image information from the scanner 32 through the scanner interface 30, and codes the same into a prescribed code. Further, the circuit 29 receives coded image information from the page memory 21 through the circuit 28, and decodes the same into image information. The decoded image information is fed into the printer 33 through the printer interface 31.

The scanner 32 scans an original set on an original table (not shown), and produces an electric signal corresponding to the image information of the original. The scanner 32 comprises an operation unit 32A, a scanner control unit 32B and a memory 32C. The unit 32A determines parameters (process information) such as the size of an original to be read, the darkness of an original and the reading density of an original. The unit 32B controls the movement of the scanner 32, and the memory 32C stores the parameters determined by the unit 32A. The printer 33 prints out image information read by the scanner 32, or image information produced from the optical disc apparatus 17. The communication control Module CCM comprises an universal communication processor UCP 34 and a business communication processor BCP 35. The UCP 34 is connected to the system bus 11, and the BCP 35 is connected to the UCP 34. The UCP 34 is the interface for use in RS-232C, GPIB, and SCSI (which are defined in the international standard). The BCP 35 is the interface for use in LAN (local area network).

Figure 2:
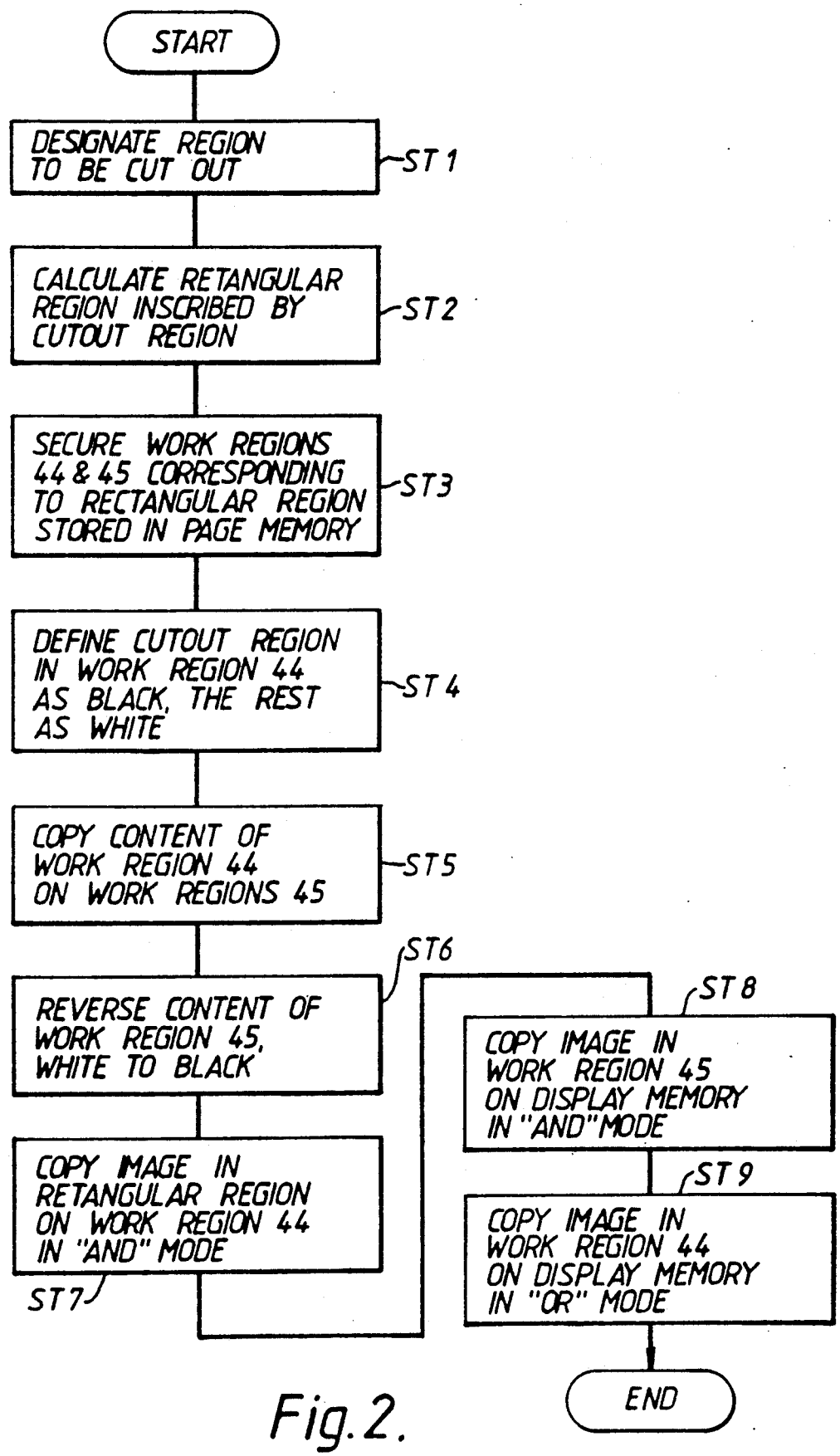

The operation of the information processing system shown in FIG. 1 will be described with reference to FIGS. 2 and 3. The system can designate a desired region to be cut out from the image information displayed on the CRT display 26. The system then cuts out the image information defined by the designated region from the entire image information displayed on the CRT display 26. Further, the system can rotate the cutout image information on the CRT display 26, change the size thereof, and move the same to a desired position on the CRT display 26. Thus, desired editing procedures can be easily performed.

Here, the case when image information of an arbitrary shape is cut out from the image information displayed on the CRT display 26 will be described. Assume that image information shown in FIG. 3a is displayed on the CRT display 26. The image information is displayed in the following manner. Specifically, image information is retrieved by the optical disc apparatus 17, or read by the scanner 32, and then stored in the page memory 21. The image information stored in the page memory 21 is fed through the display memory 23 and the display control unit 25 into the CRT display 26.

Here, the procedures of cutting out desired image information will be described. The procedure designates a desired region to be cut out from the image information 41 displayed on the CRT display 26 (STEP 1). Assume that a region shown by the dotted line in the image information 41 is designated as a region 42 to be cut out. Apexes $P_1$ through $P_4$ of the region 42 are designated by use of the mouse 16 or the keyboard 15 moving the cursor on the display 26. As a result, the coordinates of the designated apexes $P_1$ through $P_4$ are stored in the main memory 20. Further, the procedure designates positions to which the cutout image information moves on the basis of a reference position, e.g., the upper left of the display 26. The thus designated moving positions are stored in the main memory 20. Further, the moving positions of image information may also be designated even after the cutout of the image.

A rectangular region 43, which is shown by a dot-and-dash line and circumscribing the region 42, is defined in the following manner. Specifically, the CPU 13 calculates the coordinates $P_5$ through $P_8$ of apexes of the rectangular region 43. The calculation is performed on the basis of the coordinates of the apexes $P_1$ through $P_4$ stored in the main memory 20. The thus obtained coordinates $P_5$ through $P_8$ are stored in the main memory 20 (STEP 2). Thereafter, work regions 44 and 45, which correspond to the thus calculated rectangular region 43, are secured in the page memory 21, as shown in FIGS. 3a and 3b (STEP 3). The work regions 44 and 45 are processed as shown in FIGS. 3d and 3e in the following manner. Specifically, in FIG. 3d, the portion corresponding to the cutout region 42 is blacked, and the remaining portion is to be white. In other words, a logic "1" is written in the black portion, and a logic "0" is written in the white portion (STEP 4). Next, the content of the work region 44 is copied on the work region 45 (STEP 5). The content of the work region 45 is reversed such that the white portion is blacked, as shown in FIG. 3e (STEP 6).

Thereafter, the image information in the rectangular region 43 stored in the page memory 21 and the image information stored in the work region 44 are fed into an AND logic circuit 21B. The logic output produced from the AND logic circuit 21B is stored in the work region 44 (STEP 7). As a result, the image information, in which the region surrounding the cutout region 42 is white, is stored in the work region 44, as shown in FIG. 3f. Next, the image information stored in the work region 45 and the image information corresponding to the moving positions of the cutout image are sequentially fed into the AND logic circuit 21B. The logic output produced from the circuit 21B is stored in the display memory 23 at the respective moving positions (STEP 8).

As a result, the region (42 of FIG. 3g), in which the cutout image is displayed, is changed to be white. The image information corresponding to the work region 45 stored in the display memory 23 and the image information stored in the work region 44 are fed into an OR logic circuit 21A. The logic output produced from the OR logic circuit 21A is stored in the display memory 23 at the same position (STEP 9). Thus, the image information within the cutout region 42 is stored in the display memory 23 at the designated moving position. The image information stored at the designated moving position is then displayed on the CRT display 26 at the region which has been changed to be white, as shown in FIG. 3g.

As described above, in this embodiment, a rectangular region inscribed by the designated cutout region can be obtained. Further, the work regions 44 and 45 corresponding to the thus obtained rectangular region can be secured in the page memory 21. In the work regions 44 and 45, the cutout region and the remaining region are determined to be images respectively corresponding to logic values "0" and "1", i.e., inverted relation to each other. In this state, the image information stored in the rectangular region 44 and the rectangular image information 43 that includes the cutout region 42 are fed into the AND logic circuit 21B. The logic output produced from the circuit 21B is stored in the rectangular region 44.

As a result, only the image information stored in the cutout region 42 can be stored. Further, the image information at the desired position in the display memory 23 and the image information of the work region 45 are fed into the AND logic circuit 21B. The logic output produced from the circuit 21B and the image information stored in the work region 44 are fed into the OR logic circuit 21A. The logic output produced from the circuit 21A is stored in the display memory 23 at the desired position. Thus, after the rectangular region which includes the cutout region has been stored in the work region, the image information can be cut out either through the AND logic circuit 21B or the OR logic circuit 21A. This cutout can be achieved regardless of the coordinate information that represents the shape of the cutout region. As a result, irrespective of the shape of a region to be cut out, a desired region of image information can be easily cut out.

In this embodiment, the region to be cut out is defined as a quadrangle. However, this invention is not limited to this, i.e., an arbitrary shape, such as a circle, an ellipse and the like may also be processed. Further, a plurality of windows may be provided on the CRT display 26. Thus, plural pieces of image information different to each other may be displayed in the respective windows on the CRT display 26. In this case, one piece of image information and the other piece of image information can be easily synthesized. Specifically, a desired region in one piece of image information is cut out, and the cutout region is moved to the other piece of image information.

As described above, according to the present invention, there can be provided an information processing system which comprises a first memory for storing image information, a designating section for designating a desired region of the image information stored in the first memory as a cutout region, a determining section for determining a rectangular region circumscribing the designated cutout region, a section for determining first and second work regions having the same size as the rectangular region, a memory for storing the first and second work regions, a section for designating a portion corresponding to the designated cutout region in the first work region as first data, and designating a region other than the portion as second data, a section for determining a new region displaying the cutout region by calculating information in the second work region and image information stored in the first memory, a section for copying image information in the designated cutout region into the first work region by calculating information in the first work region and the image information stored in the first memory, and a section for displaying the image information in the first work region in the new region.

Obviously, numerous additional modifications and variations of the present invention are possible in light of the above teachings. It is therefore to be understood that within the scope of the appended claims, the invention may be practiced otherwise than as specifically described herein.

What is claimed is:

1. An information processing system, comprising:
   first memory means for storing binary data as original information in a plurality of memory regions;
   means for designating a region storing desired image information in said first memory means;
   means for determining a shape circumscribing said designated region;
   second memory means for storing first binary data in a region corresponding to said designated region and for storing second binary data in a region corresponding to a region within said determined shape but not including said designated region;
   means for performing logical calculations on image information corresponding to said determined shape and the first and second binary data of said second memory means;
   third memory means for storing other binary data; and
   means for transferring a result of the performed logical calculation to the third memory means, wherein the results of the performed logical calculation completely replace all of the other binary data in a region in the third memory means corresponding to the designated region.

2. The system of claim 1, wherein said shape determined by said determining means is a rectangular region.

3. The system of claim 1, wherein said logical calculations include a logical AND calculation.

4. An information processing system comprising:
   means for displaying an image;
   first memory means for storing display image information to be displayed by the displaying means, said image information including binary data stored in a plurality of memory regions;
   second memory means for storing said binary data as original image information in a plurality of memory regions, said second memory means including means for designating a region storing desired image information therein;

means for determining a shape circumscribing said designated region;

third memory means for storing first binary data in a region corresponding to said designated region, and for storing second binary data in a region corresponding to a region within said determined shape but not including said designated region;

fourth memory means for storing said second binary data in a region corresponding to said designated region, and for storing said first binary data in a region corresponding to a region within said determined shape but not including said designated region;

means for obtaining first image information by performing logical calculations on a part of said original image information in a memory region of said second memory means corresponding to said determined shape and information stored in said third memory means;

first processing means for storing said first image information in said third memory means;

means for obtaining second image information by performing logical calculations on a part of displaying image information in a memory region of said first memory means corresponding to said determined shape and information stored in said fourth memory means;

second processing means for storing said second image information in place of a part of displaying image information in said first memory means;

means for obtaining third image information by performing logical calculations on said first image information and said second image information; and means for storing said third image information in place of said second image information in said first memory means.

5. The system of claim 4, wherein said shape determined by said determining means is a rectangular region.

6. The system of claim 4, wherein said logical calculations include a logical AND calculation.

* * * * *